United States Patent [19]

Kobayashi et al.

[11] 4,034,180

[45] July 5, 1977

[54] METHOD OF CONTINUOUSLY SOLDERING SMALL ELEMENTS ARRANGED GENERALLY IN A LINE BY A CONCENTRATED RADIANT ENERGY SOURCE

[75] Inventors: Toshihiko Kobayashi, Mitaka; Tetsusaburo Kanbayashi, Niiza; Satoshi Ichioka; Shinjiro Takeuchi, both of Toda; Yukinori Matsushima, Tokyo, all of Japan

[73] Assignees: Kokusai Denshin Denwa Kabushiki Kaisha, Tokyo; Mishima Kosan Co., Ltd., both of Japan

[22] Filed: May 28, 1975

[21] Appl. No.: 582,412

Related U.S. Application Data

[63] Continuation of Ser. No. 367,181, June 5, 1973, abandoned.

[30] Foreign Application Priority Data

June 10, 1972 Japan .............................. 47-58077

[52] U.S. Cl. .......................... 219/85 BM; 219/354; 228/179
[51] Int. Cl.² .......................................... B23K 3/04
[58] Field of Search ....... 219/85 D, 85 BA, 85 BM, 219/85 F, 85 M, 354, 366; 228/25, 32, 179; 432/33

[56] References Cited

UNITED STATES PATENTS

| 2,977,455 | 3/1961 | Murphy ............................ 219/366 |
| 3,588,425 | 6/1971 | Erickson ........................ 219/85 BA |
| 3,608,190 | 9/1971 | Steranko et al. .............. 228/179 X |
| 3,649,811 | 3/1972 | Schoenthaler ................ 219/85 BA |
| 3,675,841 | 7/1972 | Gutlhuber et al. ................... 228/25 |
| 3,710,550 | 1/1973 | Osborne ........................ 219/354 X |

Primary Examiner—Bruce A. Reynolds
Assistant Examiner—N. D. Herkamp
Attorney, Agent, or Firm—Wenderoth, Lind & Ponack

[57] ABSTRACT

Continuous soldering of small elements along a line is achieved by a radiant beam spot lamp which moves intermittently along the line, and radiant energy is supplied only while the lamp is stopped to form partially overlapped heating zones.

1 Claim, 7 Drawing Figures

DISPLACEMENT DIRECTION

DISPLACEMENT DIRECTION

METHOD OF CONTINUOUSLY SOLDERING SMALL ELEMENTS ARRANGED GENERALLY IN A LINE BY A CONCENTRATED RADIANT ENERGY SOURCE

This is a continuation of application Ser. No. 367,181, filed June 5, 1973, now abandoned.

BACKGROUND OF THE INVENTION

The present invention relates to a method of and apparatus for continuously soldering small elements arranged generally in a line by a concentrated radiant energy source.

Soldering by hand has long been known. However, when the elements to be soldered are small, difficulties arise in that with hand soldering it takes a very long time to complete a small element such as a circuit board having many conductors to be soldered, and that bridging or insufficient solder strength can not completely be avoided even when careful work is performed.

Another known method to solder small elements utilizes electric resistance heating or ultrasonic energy. However, melting of wires or insufficient solder strength also tends to occur with this method, and a long time is required to connect a great many conductors.

It is also known to use an infrared radiant lamp to melt solder. Usually, the lamp concentrates a radiant beam in the form of an elongated band or line from the elongated lamp. Concentrated radiant heating itself is useful and advantageous. There is complete absense of physical contact, thus heater born contamination and disturbing forces on the elements to be soldered are eliminated. Also, it applies heating energy rapidly without disturbing surrounding structures. Soldering by means of an elongated lamp furthermore can treat a great many elements arranged in a line by only one process. However, temperature distribution along the line tends to differ and insufficient heating and overheated portions tend to occur. Also, the lamp and the control device must be very precise to attain the desired result.

Concentrated spot radiation beam heating by moving the source along a line of elements to be soldered is also utilized. However, by continuously moving the beam, temperature distribution is not satisfactory along the line of elements to be soldered, and the line tends to overheat as the lamp is moved. Thus satisfactory results are not easily attained.

SUMMARY OF THE INVENTION

The present invention provides a method of and apparatus for continuously soldering small elements arranged generally in a line by concentrated radiant energy from a spot beam lamp, to mitigate the above mentioned disadvantages.

According to the present invention, the method for appropriately heating a region having a length equal to that of the line and a narrow width comprises the steps of intermittently moving the focus of the radiant energy source along the line and passing radiant energy from the source to the elements only while the source is stopped to form successively partially overlapped heating zones.

As described, the lamp is extinguished or sheltered from the element while the lamp is moving. Thus the beam forms spaced spots or small circles along the line to be soldered. This is just the reverse of the known continuous soldering method.

Experiments have established that better results are obtained by intermittently moving the lamp along the line than by continuously moving the lamp.

Also, by intermittently moving the lamp along the line, and by supplying radiant energy to the elements only while the lamp is moving, good temperature distribution along the line is achieved.

The method can be controlled by a simple control device, and the apparatus is also simple and cheap compared with a soldering machine utilizing a long beam lamp.

DETAILED DESCRIPTION OF PREFERRED EMBODIMENTS

Figure 1:
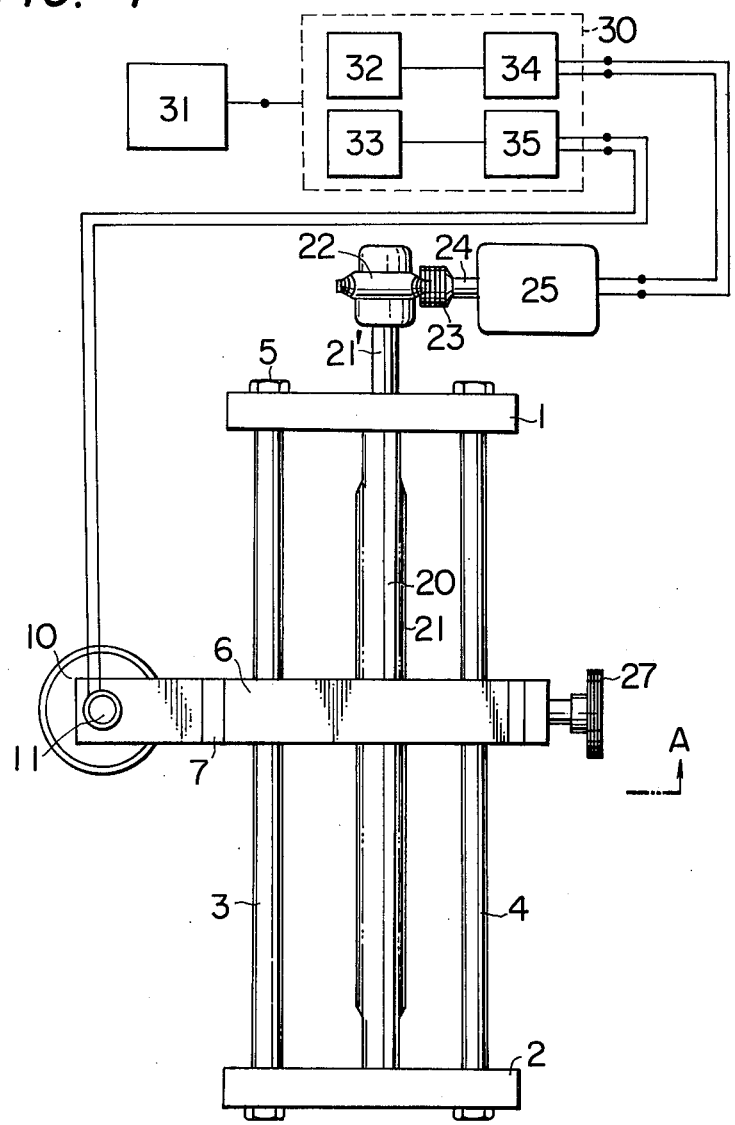
FIG. 1 is a diametrical plan view of a soldering apparatus embodying the present invention.
Figure 2:
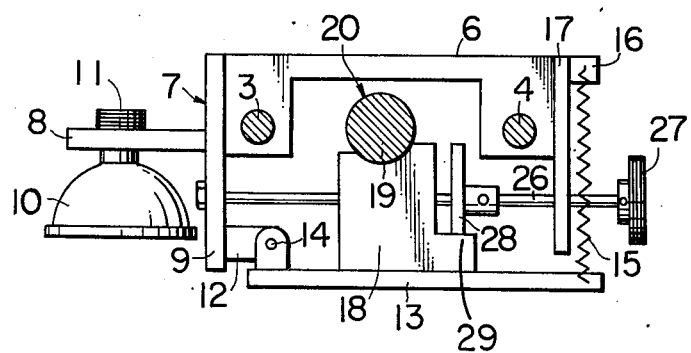
FIG. 2 is a longitudinal sectional view along line A—A of FIG. 1, FIG. 3 graphically illustrates the insufficient temperature distribution of a connector terminal sheet on an enlarged scale.

FIGS. 1 and 2 show essential portions of a soldering device for soldering small elements such as printed circuits for connecting many wires to a printed wiring board. End plates 1 and 2 are secured on a carriage (not shown) and move rightward and leftward on a board (not shown), which elements to be soldered are arranged. The end plates 1 and 2 are connected to each other by guide rods 3 and 4 which are secured by means such as nut 5. Slidably supported by the guide rods 3 and 4 is a slider 6 which provides openings as shown in FIG. 2 to accommodate the guide rods 3 and 4.

A bracket 7 having first arm 8 and second arm 9 is secured on one end face of the slider 6. The first arm 8 has an opening in which vertically adjustable support 11 is positioned and supports lamp 10 to concentrate an infra-red heating beam from the lamp 10. Alternately, a laser ray generating device may be mounted on the arm 8.

The second arm 9 of the bracket 7 provides a lug 12 to pivotably support a plate 13 by a pin 14. The free end of the plate 13 is supported by a spring 15 which is connected to a lug 16 secured on a vertical plate 17 which in turn is secured to the other end of the slider 6.

A block 18 having segmental inner thread 19 is secured on the plate 13. A lead screw shaft 20 is rotatably but not axially movably supported by the end plates 1 and 2. The lead screw 21 of the shaft 20 is normally engaged with the segmental inner thread 19 of the block 18. One end 21 of the shaft 20 at the other side of the end plate 1 is connected to a worm wheel 22 which is engaged to a worm 23 secured with a shaft 24 of a motor 25 which is also mounted on the carriage, (not shown).

A rod 26 is rotatably supported by the arm 9 and the vertical plate 17 and has at one end thereof a knob 27. A cam 28 is secured to the rod 26 and engages a shoulder 29 of the block 18 by rotating of the knob 27. A large diameter portion of the cam 28 rides on the shoulder 29 to rotate the plate 13 and the block 18 against the spring 15. Thus the segmental inner thread 19 is disengaged from the lead screw 21 so that the slider 6 with the lamp 10 can be manually adjusted along the guide rods 3 and 4.

The lamp 10 is connected through control device 30 with power source 31. The drive motor 25 is also connected through control device 30 with power source 31. The control device 30 includes suitable means to control the lamp 10 and the motor 25 respectively such as timers 32 and 33, voltage regulator 34 and current regulator 35.

General operation of the device shown in FIGS. 1 and 2 is as follows:

The carriage, not shown, mounting the device is laterally, i.e. leftward or rightward in FIG. 1, adjusted to align elements to be soldered to the axis of the lamp 10. The knob 27 is rotated to rotate the cam 28 so that the segmental inner thread 19 of the block 18 is released from the lead screw 21 of the shaft 20. The slider 6 can then be manually adjusted to align the starting position of the soldering operation to the axis of the lamp 10. Alternately, the motor 25 can be energized to rotate in a desired direction to drive worm 23. Thus worm wheel 22, meshing with the worm 23, is rotated with the lead screw shaft 20. The lead screw 21 meshing with the segmental inner screw 19 drives the block 18, plate 13, lug 12, bracket 7 and the slider 6 along the guide rods Alternately, and 4. Thus, the lamp 10, coupled to the slider 6 through the bracket 7, is driven slowly by the motor 25 to align the starting position.

Thereafter the lamp 10 is energized and also the motor 25 is energized by the control device 30 to supply suitable heat energy to the elements to be soldered while the lamp 10 is moved at a predetermined rate. After the elements are soldered along the vertical line of FIG. 1, the lamp 10 is deenergized and the device is moved by the carriage to the next line to be soldered.

EXPERIMENT 1

Figure 3:
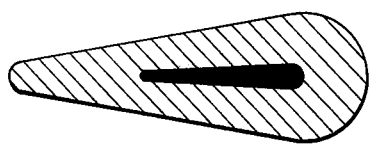

At first, the terminals of the lamp 10 and the motor 25 are connected to a same timer, to continuously move the lamp 10 while the lamp is energized. FIG. 3 shows the solder melt range when the lamp current is 8 ampere, heating time is 2 minutes, and the displacement speed is 0.5mm/sec. The connection terminal sheet is formed by solder plated conductors adhered on a non-conductive sheet of $50\mu$ thickness. The solder consists of 60% Sn and 40% Pb, and the thickness of the solder is $3\mu$. The hatched area shows the solder melt range, and the black area shows the overheated range. As shown, the melted range is not uniform along the lamp displacement line. When the lamp speed is higher than 1mm/sec, the range is more uniform, however, the soldered strength of the high density wires did not attain desired values.

EXPERIMENT 2

Figure 4:
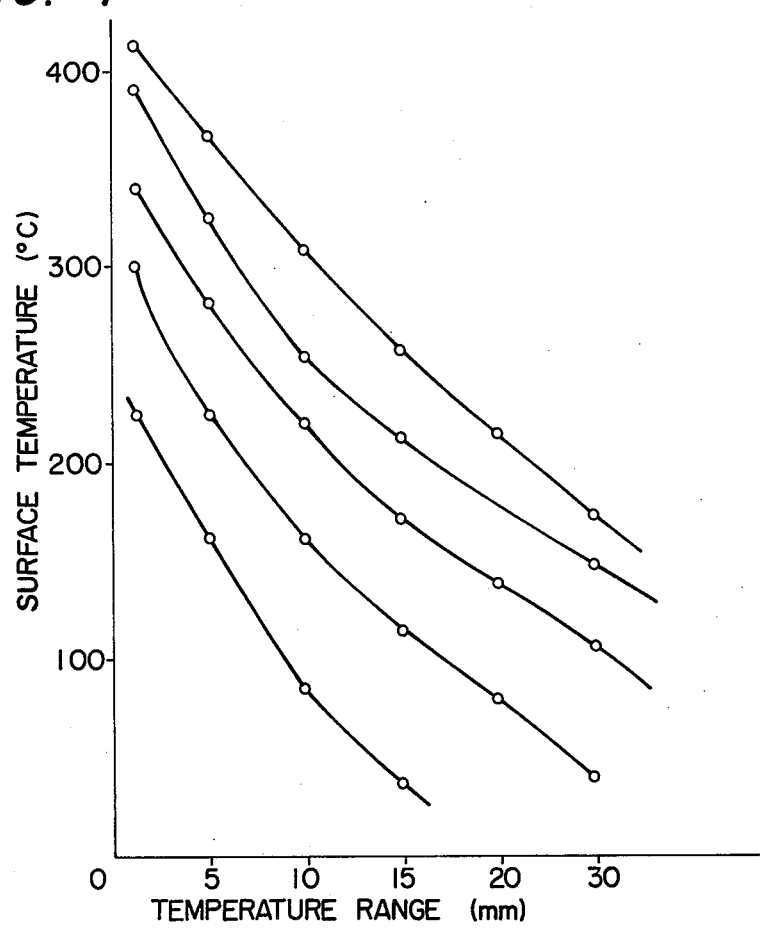
FIG. 4 is a graph showing the temperature distribution of a radiation beam spot.

FIG. 4 shows the result of an experiment to show temperature distribution of the concentrated lamp focus at various heating times. The lamp is supplied with a constant current of 8.0 ampere, and the lamp is stationary.

Figure 5:
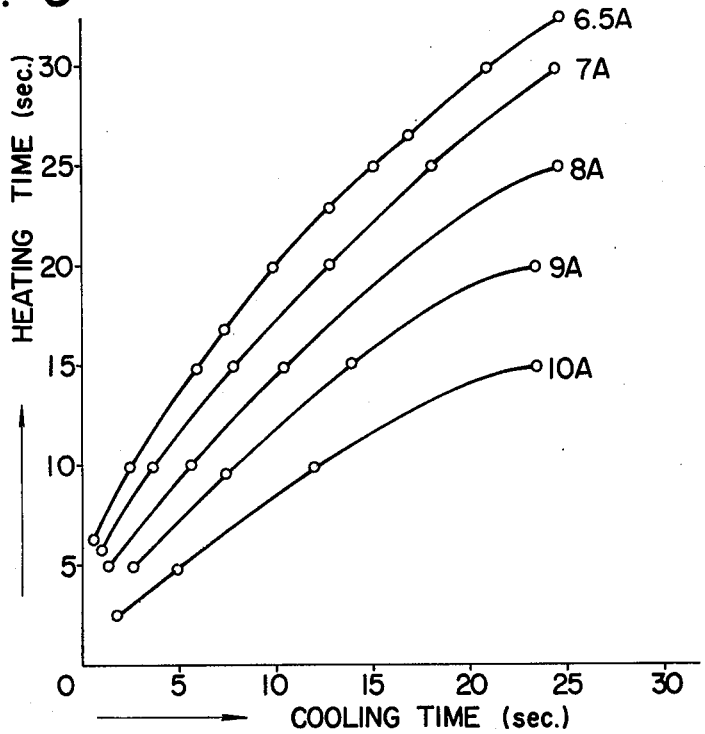
FIG. 5 is a graph of heating time to cooling time in relation to lamp current, FIG. 6 graphically illustrates temperature distribution similar to FIG. 3 but illustrating satisfactory conditions.

FIG. 5 also shows the results of an experiment to show the relation between heating time and cooling time of the lamp at various currents to attain uniform temperature distribution while moving the lamp.

Figure 6:
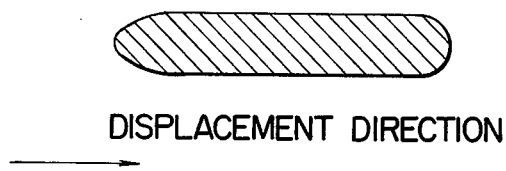

In the second experiment, the lamp is displaced while energized and is stopped while cooling. The solder melting range along the displacement direction is shown in FIG. 6. The cycle is as follows: The heating time is 10 seconds, the cooling time is 5 seconds, and the other conditions are similar to the first experiment. The temperature distribution is uniform and the overheated range shown in FIG. 3 does not appear. However, the soldered strength is not sufficient. By reducing the displacement speed, the soldered strength is improved, however, the production rate is also lowered to produce another problem.

EXPERIMENT 3

To mitigate the above mentioned problems of experiments 1 and 2, according to the present invention, the drive motor 25 is stopped while the lamp 10 is energized, and the lamp is extinguised and cooled while the motor drives the lamp. The heating conditions are similar to those of the second experiment. The temperature distribution was uniform along the line of displacement of the lamp. As to the soldered strength, the connection of high density wires of several hundred conductors of $50\mu$ width and spaced at $50\mu$ was sufficient.

Figure 7:
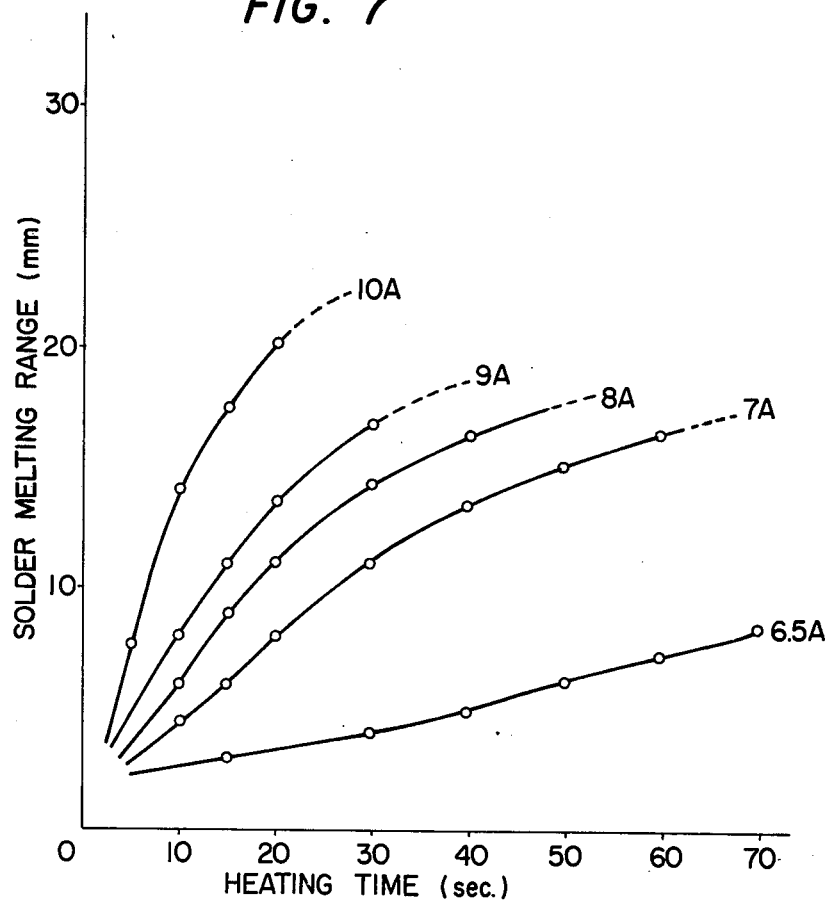
FIG. 7 is a graph of heating time to melting diameter of solder.

FIG. 7 shows the relation between solder melt diameter and heating time at various lamp currents. Each displacement distance should be less than the melting diameter of the solder at a given lamp current and a given heating time, when the elements to be soldered are uniformly distributed along the lamp displacement line. Of course, when the elements to be soldered are spaced apart in groups, each lamp displacement distance can be selected to prevent heating of the vacant spaces.

As described, the soldering method, according to the present invention, provides a cooling period of the lamp along the displacement line, and the lamp is stopped while heating and is moved while cooling. This heating cycle is just reverse of the common process. However, as described above, the solder melting range along the lamp displacement line is uniform and improved results can be attained compared with other heating cycles. Also, by suitable selection of the heating time and heating current, desired connections between base materials, e.g. metal, resin, or glass, and areas to be connected can be obtained.

The present invention is described by an embodiment utilizing an infra-red heater lamp. However, the present invention is not limited to this embodiment. Laser rays can be used advantageously by selecting the displacement distance and heating time corresponding to given apparatus. Also, the lamp deenergizing period can be attained by using a shield plate or scattering plate. Further, the device can be reversed, i.e. the elements to be soldered can be moved along a line passing across a stationary lamp. In such case, the still lamp is energized and extinguished as described above.

What is claimed is:

1. In a method of successively soldering small elements arranged generally in a line by means of a substantially circular concentrated radiant beam source by successive heating of a region having a length equal to that of the line and a narrow width, the improvement comprising the steps of:

intermittently moving said source along the line by predetermined increments;
operating said source only while movement of said source along said line is stopped to apply radiant energy to the elements in successive circular heating zones along said line;
interrupting operation of said source to interrupt application of said radiant energy to said elements while said source is moved along said line; and controlling the movement of said source along said line, as a function of the length of time of operating said source to apply said radiant energy and of the current of said source, such that the length of each said predetermined increment of movement is less than the diameter of said circular heating zones, and thereby partially overlapping said circular heating zones along said line.

* * * * *